(12) United States Patent
Bertola

(10) Patent No.: US 10,767,700 B2
(45) Date of Patent: Sep. 8, 2020

(54) FLANGED INNER RING FOR WHEEL HUB BEARINGS

(71) Applicant: Aktiebolaget SKF, Gothenburg (SE)

(72) Inventor: Maurizio Bertola, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/115,686

(22) Filed: Aug. 29, 2018

(65) Prior Publication Data

US 2019/0145463 A1 May 16, 2019

(30) Foreign Application Priority Data

Nov. 14, 2017 (IT) .......................... 102017000129350

(51) Int. Cl.
| | |
|---|---|
| *F16C 33/60* | (2006.01) |
| *B60B 27/00* | (2006.01) |
| *F16C 33/58* | (2006.01) |
| *B21K 1/40* | (2006.01) |
| *F16C 33/64* | (2006.01) |

(52) U.S. Cl.
CPC .............. *F16C 33/605* (2013.01); *B21K 1/40* (2013.01); *B60B 27/0078* (2013.01); *F16C 33/581* (2013.01); *F16C 33/64* (2013.01); *B60B 27/0005* (2013.01); *F16C 2220/46* (2013.01); *F16C 2240/30* (2013.01); *F16C 2240/60* (2013.01); *F16C 2240/70* (2013.01); *F16C 2326/02* (2013.01)

(58) Field of Classification Search
CPC .. F16C 33/605; F16C 2326/02; F16C 33/581; F16C 33/64; F16C 2220/46; F16C 2240/30; F16C 2240/60; F16C 2240/70; B60B 27/0005; B60B 27/0078; B21K 1/40

See application file for complete search history.

(56) References Cited

U.S. PATENT DOCUMENTS

| | | | |
|---|---|---|---|
| 7,942,585 B2 * | 5/2011 | Hirai ....................... | B60B 27/00 301/35.627 |
| 2003/0138176 A1 * | 7/2003 | Umekawa ............... | B60B 27/00 384/544 |

(Continued)

FOREIGN PATENT DOCUMENTS

| | | |
|---|---|---|
| EP | 2839899 A1 | 2/2015 |
| WO | 2016093273 A1 | 6/2016 |

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A flanged inner ring for wheel hub bearings, the inner ring comprising a tubular body supporting the bearing, the body being coaxial with an axis (A), and a flange, which is transversal to the axis (A), the flange being provided with a plurality of threaded through holes that are distributed around the axis (A) and includes: —an outer annular mounting surface and an inner surface that is axially faced towards an outer ring of the bearing; the flange having a respective base axial thickness (SAF) and comprising for each threaded through hole, a respective radial arm which is arranged on the inner surface of the flange facing the outer ring; the inner ring being forged in one piece together with the flange and the radial arms. Between each pair of adjacent arms there is a flower-shaped sector with a chamfer made by forging along the outer surface thereof.

9 Claims, 3 Drawing Sheets

(56) References Cited

U.S. PATENT DOCUMENTS

| | | | |
|---|---|---|---|
| 2005/0231025 A1* | 10/2005 | Yasumura | B60B 27/0005 301/105.1 |
| 2006/0133708 A1* | 6/2006 | Meeker | B60B 27/00 384/544 |
| 2007/0086690 A1* | 4/2007 | Niebling | B60B 27/00 384/544 |
| 2010/0111458 A1* | 5/2010 | Hirai | B60B 27/0005 384/544 |
| 2010/0209034 A1* | 8/2010 | Masuda | B21K 1/12 384/544 |
| 2010/0210369 A1* | 8/2010 | Masuda | B21K 1/12 464/179 |
| 2010/0215304 A1* | 8/2010 | Torii | B60B 27/0005 384/544 |
| 2011/0212788 A1* | 9/2011 | Kobayashi | B60B 27/0005 464/145 |
| 2014/0208593 A1* | 7/2014 | Kaiser | B21H 1/12 29/898.062 |
| 2015/0010260 A1* | 1/2015 | Meeker | B60B 27/001 384/544 |
| 2015/0217329 A1* | 8/2015 | Iwamoto | B05D 3/0281 428/457 |
| 2016/0114624 A1* | 4/2016 | Morello | B60B 27/0005 384/480 |
| 2017/0313127 A1* | 11/2017 | Morello | B60B 27/0078 |
| 2018/0135702 A1* | 5/2018 | Nakatsuji | B60B 27/00 |
| 2018/0222250 A1* | 8/2018 | Nakagawa | B60B 3/16 |

* cited by examiner

FLANGED INNER RING FOR WHEEL HUB BEARINGS

CROSS-REFERENCE

This application claims priority to Italian patent application no. 102017000129350 filed on Nov. 14, 2017, the contents of which are fully incorporated herein by reference.

FIELD OF THE INVENTION

The present invention relates to a flanged wheel hub, in particular to a flanged inner ring for wheel hub bearings.

BACKGROUND

Known flanged wheel hubs for wheel hub bearings have a tubular support body for a wheel hub bearing, in particular for the inner ring thereof, that is coaxial to an axis of rotation of the bearing, and a flange that is transversal to the axis of rotation, includes a plurality of threaded through-holes distributed uniformly about the axis, and has:
- an outer annular mounting surface on which are mounted a brake disk and a rim fastened using threaded screws inserted into the through-holes, and
- an inner surface axially facing an outer ring of the rolling bearing.

The flange has a uniform base axial thickness designed to withstand the mechanical stresses typical of wheel hub bearings, and also has one radial arm for each threaded through-hole that is arranged on the inner surface of the flange to face the outer ring and extends radially outwards from a mounting shoulder of the wheel hub bearing. Each radial arm acts as a strengthening element for the flange at least at the threaded through-holes.

Between each pair of adjacent radial arms, the flange of the tubular support body for the inner ring of the bearing has lightened radial portions, on account of which such flanges are commonly referred to as being flower-shaped. The flange is made by forging. Along the outer surface of each flower-shaped sector, the flange also has an outer chamfer intended to optimize the overall weight of the flanged wheel hub, the chamfer being formed by machining with stock removal.

This stock removal machining evidently involves some difficulties when working and making the wheel hub bearing during mass production. Indeed, machining (by brushing or using another tool) is a critical operation carried out once the bearing is in contact with the brake disk. Furthermore, machine tooling risks increasing the oscillation value of the flange in relation to the brake disk and creating problems relating to the inevitable presence of burrs on the surface of the outer chamfer.

Further machine tooling ultimately impacts both on the production times of the bearing and increases the related costs.

BRIEF SUMMARY OF THE PRESENT INVENTION

The present invention is intended to make a flanged inner ring for wheel hub bearings that does not have the aforementioned drawbacks.

The present invention describes a flanged inner ring for wheel hub bearings in accordance with the following configuration:
the flanged inner ring comprising a tubular body supporting the wheel hub bearing, the body being coaxial with an axis (A), and a flange, which is transversal to the axis (A), the flange being provided with a plurality of threaded through holes that are distributed around the axis (A), the flanged inner ring comprising:
- an outer annular mounting surface; and
- an inner surface that is axially faced towards an outer ring of the bearing, the flange having a respective base axial thickness (SAF) and comprising for each threaded through hole, a respective radial arm which is arranged on the inner surface of the flange facing the outer ring; the flanged inner ring being forged in one piece together with the flange and the radial arms; and
- a sector having a forged chamfer along its outer surface, the sector being located between each couple of adjacent radial arms.

In another aspect of the present invention, the respective base axial thickness (SAF) is greater than 7 mm and therefore suitable to be used for the forging process.

In another aspect, wherein the respective base axial thickness (SAF) is greater than 7.7 mm and therefore suitable to be used for the forging process.

In another aspect, wherein a length (S) of the chamfer is substantially equal to 2 mm.

In another aspect, an amplitude of an angle (α) of the chamfer is substantially equal to 30°.

In another aspect, a length of a fillet radius (R) is substantially equal to 2 mm.

In another aspect, a length (S) of the chamfer is in a range that is between 1.5 mm and 2.5 mm.

In another aspect, an amplitude of an angle (α) of the chamfer is in a range that is between 25° and 35°.

In another aspect, a length of a fillet radius (R) between the chamfer and the outer annular mounting surface of the flange is in a range that is between 1.5 mm and 2.5 mm.

In another aspect, the flanged inner ring is combined with an outer ring, which is coaxial to an axis (A), forming the wheel hub bearing, the wheel hub bearing being integrated into a flanged hub wheel.

BRIEF DESCRIPTION OF THE DRAWINGS

The invention is described below with reference to the attached drawings, which show non-limiting example embodiments of same, in which.

DETAILED DESCRIPTION OF THE PRESENT INVENTION

Figure 1:
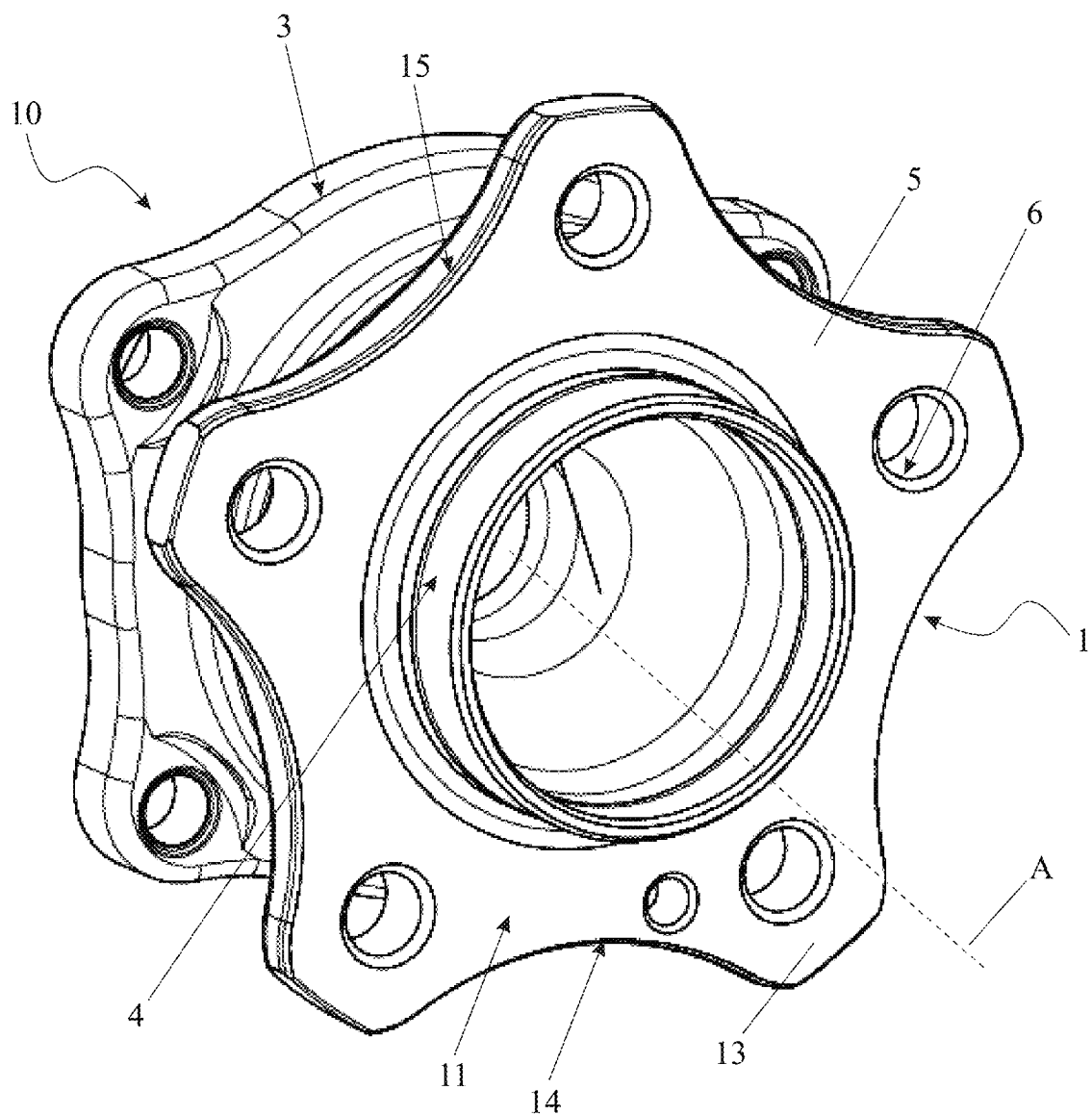
FIG. 1 presents a perspective view, with parts removed for the sake of clarity, of a flanged inner ring for wheel hub bearings in accordance with the invention.
Figure 2:
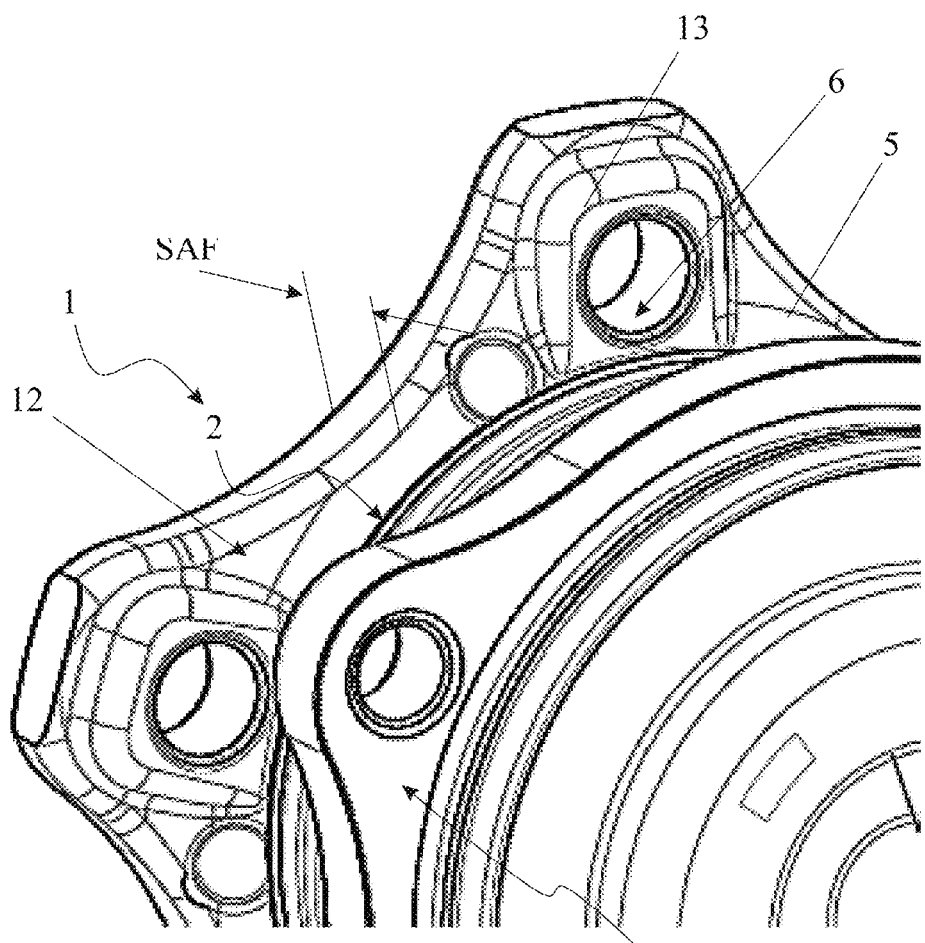
FIG. 2 presents a detail of another perspective view of the flanged inner ring for wheel hub bearings originally introduced in FIG. 1.

With reference to FIGS. 1 and 2, reference sign 10 indicates, as a whole, a flanged wheel hub for a wheel hub bearing 2 including a flanged inner ring 1 and an outer ring 3, which is coaxial to an axis A.

Throughout the present description and the claims, terms and expressions indicating position and orientation, such as "radial" and "axial", are intended to refer to the central axis of rotation A of the bearing 2. On the other hand, expressions such as "axially external" and "axially internal" refer to the assembled condition, and in this case preferably refer to a wheel side and to a side opposite the wheel side respectively.

The flanged inner ring 1 has a tubular support body 4 for the bearing 2 that is coaxial with the axis A, and a flange 5 that is transversal to the axis A and provided with a plurality of threaded through-holes 6 uniformly distributed about the axis A.

According to the known art, and therefore not illustrated in the aforementioned figures, a sliding track for the bearing 2 is hollowed directly out of the tubular body 4 level with a shoulder, on which a seal is mounted. In an alternative embodiment of the flanged wheel hub 10, also known and not illustrated, the bearing 2, instead of being partially integral with the body 4, includes two inner rings provided with respective sliding tracks, and one of the two inner rings is mounted on the body 4 axially behind the shoulder.

As also illustrated in FIGS. 1 and 2, the flange 5 has an outer annular mounting surface 11 on which are mounted a brake disk and a rim (not shown) fastened by means of threaded screws (not shown) inserted in the threaded through-holes 6, and an inner surface 12 axially facing the outer ring 3.

Figure 4:
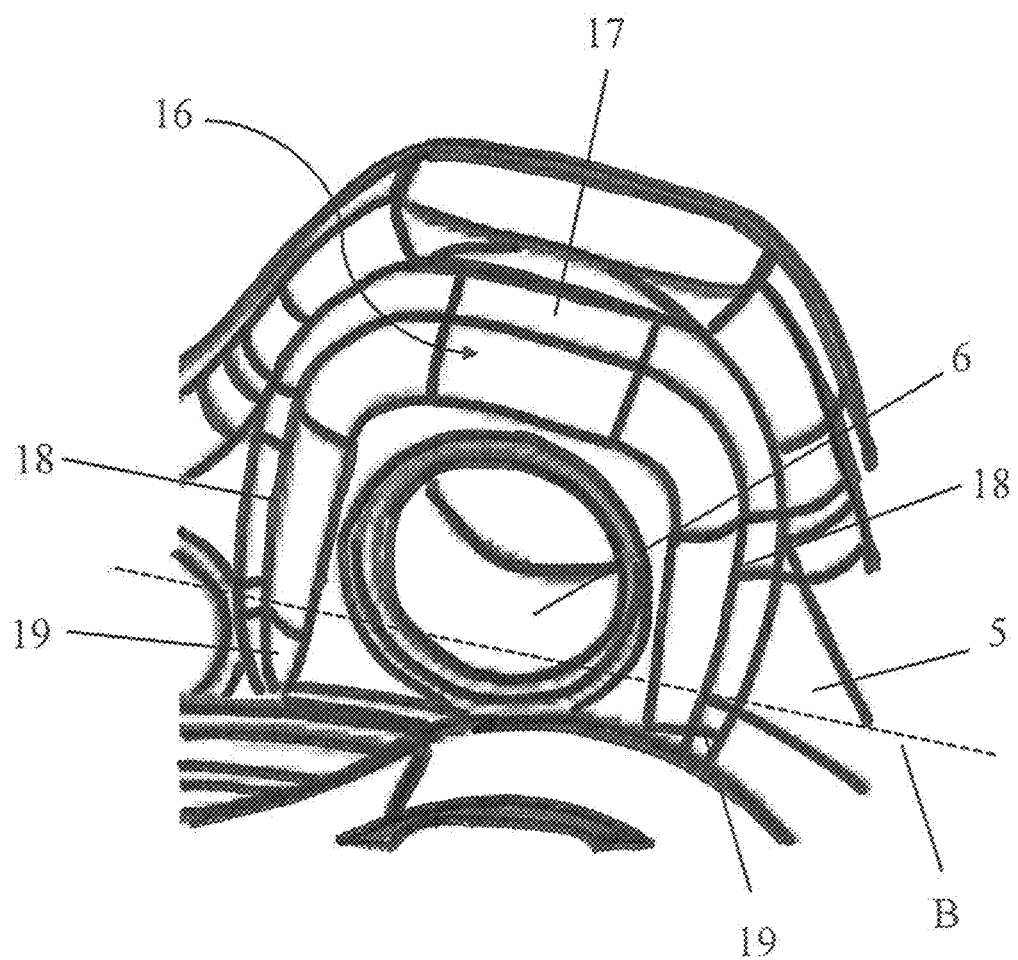
FIG. 4 is an enlarged partial view of a portion of the flange 5 of FIG. 2 which illustrates the rib 16 located thereon.

Between the two surfaces 11 and 12, the flange 5 has a uniform base axial thickness SAF calculated to withstand the mechanical stresses typical of wheel hub bearings, and furthermore has, for each threaded through-hole 6, a radial arm 13 that is arranged between the surfaces 11 and 12 of the flange 5. The wheel hub 10 is made by forging and has from the outset radial arms 13 that form a single body with the flange 5. Referring specifically to FIG. 4, each threaded through-hole 6 is preferably located within an area defined by a rib 16. Each rib 16 has a rib base 17 and opposing rib sides 18 which form a U-shape. The ribs 16 are located on the inner surface 12 of the flange 5 and are configured to project toward the outer ring 3. The opposing rib sides 18 each have a taper 19 formed by a reduced thickness as measured in a direction B perpendicular to the axis A and parallel to the rib base 17. Each taper 19 is located on an end of the rib 16 opposite of the rib base 17.

Between each pair of adjacent radial arms 13, the flange of the tubular support body for the inner ring of the bearing has lightened radial portions, on account of which such flanges are commonly referred to as being flower-shaped. Consequently, there is a flower-shaped sector 14 (also referred to as an arcuate section 14 in the specification and claims) between each pair of adjacent arms 13. Along the outer surface of each arcuate section 14, the flange also has an outer chamfer 15. The flange is made by forging, as is the outer chamfer 15. As a result, known stock removal machining used in the known art to form the outer chamfer is entirely avoided.

The solution according to the present invention works as follows: on the basis of a design for a flower-shaped flanged inner ring, an outer chamfer 15 can be made by forging, and not by machine tooling, about the entire perimeter of the flange 5 or the perimeter of each flower-shaped sector 14.

The technical viability of the forged chamfer 15 is based on optimization of the flanged inner ring design, setting the axial thickness value SAF to be used for the forging process to a minimum of approximately 7 mm, or more advantageously to a minimum of 7.7 mm. Using this design parameter and also adapting the value of the minimum contact area between the flange 5 and the brake disk, as permitted by the automobile manufacturer, it is possible to design the flanged inner ring with a flower shape, thereby optimizing the weight thereof.

Figure 3:
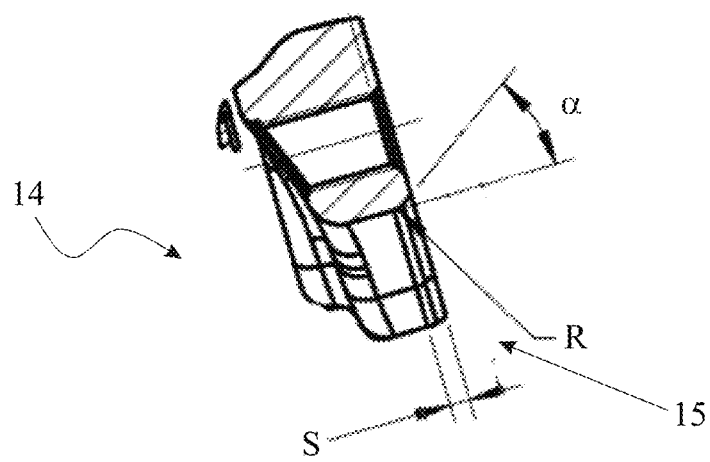
FIG. 3 presents a cross-section detail of the outer chamfer forged on the surface of the flange of the flanged inner ring, in accordance with one embodiment of the present invention.

The parameters of the chamfer can be determined with reference to FIG. 3, which shows a cross-section detail of the outer chamfer forged on the outer surface 11 of the flange of the flanged inner ring, according to one embodiment of the present invention: the length S thereof, which can be between 1.5 mm and 2.5 mm, preferably approximately 2 mm; the angle □ of the chamfer, which can preferably be between 25° and 35°, and even more preferably approximately 30°; the fillet radius R between the chamfer 15 and the outer surface 11 of the flange 5, which can be between 1.5 mm and 2.5 mm, preferably approximately 2 mm.

The advantages of this solution are clear: critical stock-removal machining while the bearing is in contact with the brake disk is avoided. Furthermore, the risk of increasing the oscillation value of the flange in relation to the brake disk and creating problems relating to the inevitable presence of burrs on the surface of the outer chamfer is avoided.

Consequently, the absence of further machine tooling has a positive impact on the production times of the bearing and in terms of limiting the related costs.

In addition to the embodiments described above, numerous other variants of the invention are possible. The embodiments are provided solely by way of example and do not limit the scope of the invention, the applications thereof or the possible configurations thereof. Indeed, although the description provided above enables the person skilled in the art to carry out the present invention at least according to one example arrangement thereof, numerous variations of the components described could be used without thereby moving outside the scope of the invention, as described in the attached claims interpreted literally and/or according to the legal equivalents of same.

What is claimed is:

1. A flanged inner ring for a wheel hub bearing, the flanged inner ring comprising:
    a tubular body configured to support the wheel hub bearing, the tubular body being coaxial with an axis (A);
    a flange disposed on the tubular body and which is transversal to the axis (A), the flange being provided with a plurality of threaded through holes that are distributed around the axis (A);
    the flange having a plurality of radial arms, each of the plurality of radial arms being separated from an adjacent one of the plurality of radial arms by an arcuate section, the arcuate section being concave when viewed in a plane defined by the flange and having a smaller radius from the adjacent ones of the plurality of radial arms;
    an outer annular mounting surface; and
    an inner surface that is configured to axially face towards an outer ring of the bearing, the flange having a respective base axial thickness (SAF), the flanged inner ring being forged in one piece together with the flange and the radial arms, each of the plurality of threaded through holes being located within an area defined by a rib having a rib base and opposing rib sides which form a U-shape, the rib being located on the inner surface of the flange and configured to project toward the outer ring, wherein the opposing rib sides each have a taper formed by a reduced thickness, as measured in a direction perpendicular to the axis (A) and parallel to the rib base, located on an end opposite of the rib base; and
    a forged chamfer is located on the arcuate section.

2. The flanged inner ring according to claim 1, wherein the respective base axial thickness (SAF) is greater than 7 mm and therefore suitable to be used for the forging process.

3. The flanged inner ring according to claim 1, wherein the respective base axial thickness (SAF) is greater than 7.7 mm and therefore suitable to be used for the forging process.

4. The flanged inner ring according to claim 3, wherein a length (S) of the forged chamfer is substantially equal to 2 mm.

5. The flanged inner ring according to claim 4, wherein a magnitude of an angle ($\alpha$) of the forged chamfer is substantially equal to 30°.

6. The flanged inner ring according to claim 5, wherein a length of a fillet radius (R) is substantially equal to 2 mm.

7. The flanged inner ring according to claim 1, wherein a length (S) of the forged chamfer is in a range that is between 1.5 mm and 2.5 mm.

8. The flanged inner ring according to claim 1, wherein an amplitude of an angle ($\alpha$) of the forged chamfer is in a range that is between 25° and 35°.

9. A wheel hub bearing, comprising the flanged inner ring of claim 1, wherein the flanged inner ring is combined with an outer ring, which is coaxial to an axis (A), and together forming the wheel hub bearing.

\* \* \* \* \*